(12) United States Patent
Colon et al.

(10) Patent No.: US 12,124,559 B1
(45) Date of Patent: Oct. 22, 2024

(54) PEER-BASED, ANGULAR DISTANCE DETECTION OF ANOMALOUS RIGHTS

(71) Applicant: Amazon Technologies, Inc., Seattle, WA (US)

(72) Inventors: Brendan Cruz Colon, Seattle, WA (US); Matthew Michael Sommer, Issaquah, WA (US); Christopher Miller, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 526 days.

(21) Appl. No.: 17/357,306

(22) Filed: Jun. 24, 2021

(51) Int. Cl.
*G06F 21/45* (2013.01)
*G06F 18/21* (2023.01)
*G06F 18/2413* (2023.01)
*G06F 21/31* (2013.01)

(52) U.S. Cl.
CPC .......... *G06F 21/45* (2013.01); *G06F 18/2193* (2023.01); *G06F 18/24147* (2023.01); *G06F 21/31* (2013.01); *G06F 2221/2141* (2013.01)

(58) Field of Classification Search
CPC ............... G06F 21/45; G06F 18/24147; G06F 18/2193; G06F 21/31; G06F 2221/2141
See application file for complete search history.

(56) References Cited

U.S. PATENT DOCUMENTS

2021/0209229 A1* 7/2021 Wu ........................ G06F 16/285
2022/0400128 A1* 12/2022 Kfir ........................ G06N 3/126

* cited by examiner

*Primary Examiner* — Alexander Lagor
*Assistant Examiner* — Rupali Dhakad
(74) *Attorney, Agent, or Firm* — K&L Gates LLP

(57) ABSTRACT

Devices and techniques are generally described for peer-based anomalous rights detection. In various examples, a rights vector may be determined for a first individual, the rights vector representing rights held by the first individual. A nearest neighbor algorithm may be used to determine a set of individuals having similar rights to the first individual. In various examples, a category label associated with the first individual may be determined. In some examples, a number of individuals of the set of individuals having the category label may be determined. In some examples, a determination may be made that the rights held by the first individual are anomalous based at least in part on the number. In some cases, alert data indicating that the rights held by the first individual are anomalous may be generated.

20 Claims, 7 Drawing Sheets

PEER-BASED, ANGULAR DISTANCE DETECTION OF ANOMALOUS RIGHTS

BACKGROUND

The access privileges and other institutional rights of individuals within an organization often shift over time as roles and responsibilities of the individuals change. In large institutions, it can be difficult to keep track of individuals' rights as they change roles and/or responsibilities. In some cases, fraudulent actors may seek to exploit the difficulties in tracking such rights and/or privileges and may acquire and/or delegate such rights and/or privileges for fraudulent purposes.

DETAILED DESCRIPTION

Figure 1:
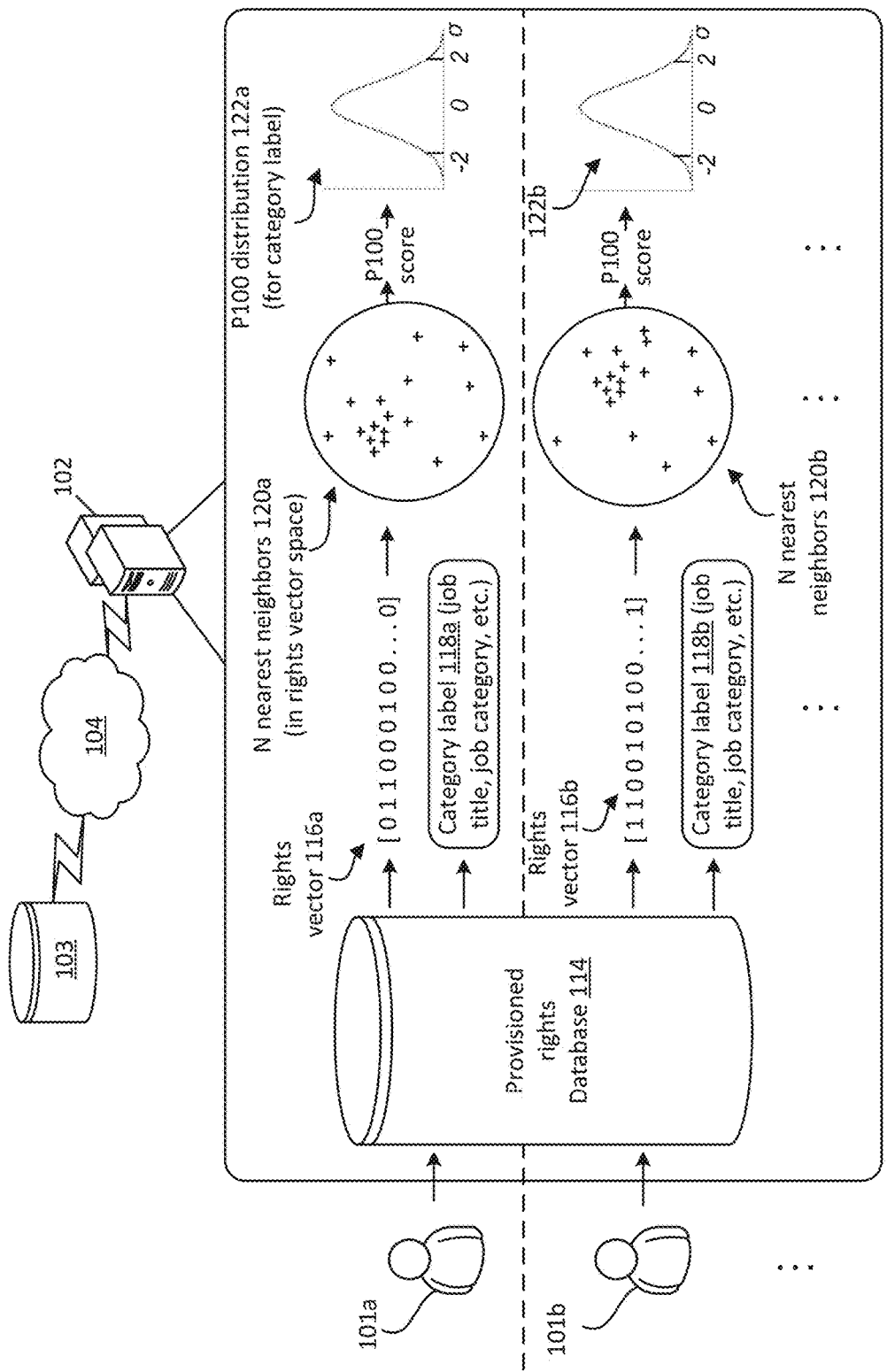
FIG. 1 is a block diagram illustrating a peer-based anomalous rights detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Large institutions and/or employers may acquire sensitive information (e.g., personally identifiable information (PII)) as part of their business practices. The need to protect such sensitive information and/or data may be balanced against providing some employees access to some of this sensitive information in order to provide the ability to assist customers and/or other users. For example, customer service associates may require access to customer account information in order to assist customers with account issues.

However, access controls are provided to limit access to potentially sensitive information to only those individuals that require such sensitive information as part of their legitimate job functions. Access rights may be abused by bad actors to attempt to gain access to sensitive user data. For example, internal users (e.g., employees) may attempt to gain access to sensitive customer data in order to exfiltrate such data from secure servers to outside systems.

However, in large institutions, employees may have different roles and responsibilities and may thus have different access rights relative to other employees, even among employees with the same job category and/or job title. Accordingly, it may be difficult to determine if an employee has acquired rights that are anomalous to that employee's job function simply by comparing that employees rights to a standard rights profile for their position.

Described herein are various systems and techniques that may be used for anomaly detection. Specifically, systems and techniques are described to determine whether an individual has acquired anomalous rights (e.g., rights that the individual should not have or does not need) relative to their peers. In this context, "peers" refers to other individuals with similar job categories, job families, job titles, etc.

In various examples, each employee (or other individual associated with the relevant institution) may be associated with a rights array (e.g., a rights vector) that defines the rights of that employee. In various examples, each element of the rights vector (or array) may correspond to a particular right, while the value of each element may indicate whether or not the employee has the associated right. In an example implementation, the rights vector may comprise binary values with a 0 indicating that the employee does not have the associated right, and a 1 indicating that the employee has the associated right. However, other implementations (e.g., non-binary implementations) are possible in accordance with the desired use case. As used herein, "rights" refer to a permission and/or level of access that is enforced by a computer and/or a computer-system that permits or prohibits (depending on presence or absence of the right) a user from taking a defined computing action, operation, and/or access to a controlled area and/or controlled information. In various examples, individuals may be designated with "roles" that may include a specified set of rights. Accordingly, in at least some cases, a role may be associated with a particular rights vector that describes the particular rights associated with the role.

In various examples, there may be a large number of rights (e.g., hundreds, thousands, tens of thousands, etc.) at an organizational level. Additionally, large organizations may have a large number of employees making comparison of individuals' rights vectors a non-trivial task. In some examples described herein, for each employee, a nearest neighbor algorithm may be executed to determine the top N nearest neighbors for each employee in the rights space. For example, a nearest neighbor algorithm may be used to determine the 100 closest employees (N=100) in terms of rights held by the subject employee. In some cases, because of the large dimensionality and size of the data, an approximate nearest neighbor algorithm may be advantageous. For example, Approximate Nearest Neighbors Oh Yeah (ANNOY) may be used to drastically reduce compute time. ANNOY subdivides n-dimensional space by inserting random hyperplanes through the data that subdivide the search space.

Upon determining the nearest neighbors in the rights space for a subject, a determination may be made of the number of the nearest neighbors that have the same predefined category or categories as the subject. In various examples, each job or position may be associated with various category descriptor labels. For example, the subject may have the category label "Customer Service Associate 2." A determination may be made of how many of the N nearest neighbors in the rights space are associated with the category label "Customer Service Associate 2." In various examples, where N=100 the number of the 100 nearest neighbors in the rights space having the matching predefined category label may be referred to as a P-100 score. More generally, the number of the N nearest neighbors in the rights space having the matching predefined category label may be referred to as a "score" or "P score" for the subject. Generally, having a lower score indicates that the subject has an anomalous rights profile among other individuals associated with the same predefined category.

In many examples herein, the P scores are referred to as "P100 scores." Although, as previously described any value for N in the nearest neighbor algorithm (or approximate nearest neighbor algorithm) may be used. Accordingly, although often referred to as P100 scores, the score may reflect the number of matching category labels among a set of individuals of any size (output by the nearest neighbor algorithm). In various examples, a distribution of the P scores for each category label of interest may be determined and a Z-score may be computed for each individual.

A Z-score (sometimes referred to as a "standard score") is given by:

$$Z = \frac{x - \mu}{\sigma}$$

where x is the observed value (the P score of the individual), $\mu$ is the mean of the sample, and $\sigma$ is the standard deviation of the sample. An individual with a Z-score above (or below) a certain threshold indicates that the individual has anomalous rights with respect to their peers. In various examples, Z-scores may be calculated for different regions and/or markets (e.g., North America, Asia, etc.). In various examples, other techniques may be used to determine that an individual has anomalous rights with respect to their peers. For example, a mean P score $\mu$ of individuals having the same category label as the individual may be determined. A residual value may be determined for the individual being evaluated (e.g., x–$\mu$). The magnitude of the residual value may be used to determine whether the individual has anomalous rights with respect to their peers.

Because an individual can be anomalous because of a lack of rights and due to an over-abundance of anomalous rights, a representative "segment vector" may be calculated to pull out over-provisioned users and determine which rights are particularly anomalous. For example, for each category label (e.g., job family, job title, department, and/or any other desired category descriptor) a representative segment vector of rights may be determined. The segment vector may be a rights vector that takes the average of all values of all individuals having the relevant category label (e.g., an average vector for all rights values for the category label). In the case where the rights vectors are binary, the segment vector will have values between 0-1. Accordingly, the segment vector measures the relative propensity of each category to have or not have each right. Each employee's right vector may be subtracted from the segment vector and rights with less than a 1/10 chance of appearing given the employee category may be flagged for potential investigation. For example, the segment vector may be used to determine that less than a threshold percentage of individuals with a relevant category label have a particular right.

As different rights may be provisioned over time, the various techniques described herein may be repeated over time (e.g., on a daily basis, weekly basis, etc.) to capture longitudinal anomalies from sudden over-provisioning of rights alongside over-provisioning stemming from a past event (e.g., where an employee changes job titles/responsibilities and acquires new rights stemming from the change while keeping rights from the previous role).

The various systems and techniques described herein may be used in a variety of applications. For example, the techniques may be used to generate a baseline "standard" permission structures for job types. This may be particularly useful for cases where a large body of employees have potential access to sensitive data. The P score (e.g., P100) metric is inherently robust to perturbation (from organizational changes, policy changes, job requirement changes, etc.) as it detects anomalies relative to other peers rather than a hard-coded standard. Additionally, when an individual has acquired anomalous rights, it can be determined which job category that individual most closely resembles (based on their rights) from their nearest neighbors (e.g., similar rights holders, such as rights holders having one or more common rights to the individual being evaluated). For example, the predominant category label (e.g., the category label associated with the most individuals among the N nearest neighbors) may be the category label that the subject individual most closely resembles (in terms of provisioned rights) whether or not the subject individual has that same predominant category label. Additionally, in some cases, the various systems and techniques described herein may be used to determine that a number of individuals with anomalous rights may report to the same individual. This can be flagged for investigation—even where the common supervisor does not themselves have an anomalous rights profile.

FIG. 1 is a block diagram illustrating a peer-based anomalous rights detection system 102, according to various embodiments of the present disclosure. In various examples, one or more computing devices may implement the peer-based anomalous rights detection system 102. In examples where more than one computing device implements the peer-based anomalous rights detection system 102, the different computing devices may communicate with one another over a network 104. For example, a remote computing device (and/or remote system of computing devices) may communicate with peer-based anomalous rights detection system 102 via an application programming interface (API) as a cloud-based service. For example, rights profiles (e.g., rights vectors) of individuals associated with an enterprise may be sent to peer-based anomalous rights detection system 102 for determination of anomalous rights profiles among the individuals.

In various examples, each of the one or more computing devices used to implement peer-based anomalous rights detection system 102 may comprise one or more processors. The one or more computing devices used to implement peer-based anomalous rights detection system 102 may be configured in communication with at least one non-transitory computer readable memory 103 ("memory 103"). In at least some examples, the one or more computing devices used to implement peer-based anomalous rights detection system 102 may communicate with memory 103 over network 104. The memory 103 may store computer-readable instructions that, when executed by at least one processor of the one or more computing devices implementing peer-based anomalous rights detection system 102, may be effective to program the one or more processors to perform the various anomalous rights detection techniques and/or execute the various algorithms described herein.

In various examples, network 104 is a wide area network, such as the Internet, while in other embodiments, the network 104 is a local area network (LAN) over which requests may be received. In some further embodiments, network 104 is a combination of the Internet and a LAN.

Individuals 101a, 101b, etc., may be individuals associated with an institution (such as an employer). Each of the individuals 101a, 101b may be associated with a respective rights vector 116a, 116b that represents the rights of that individual. In the example depicted in FIG. 1, the rights vectors for each individual are stored in provisioned rights database 114. However, provisioned rights database 114 may be a separate component from the peer-based anomalous rights detection system 102 in various embodiments. For example, when peer-based anomalous rights detection system 102 is implemented as a service, the rights vectors 116a, 116b, etc., may be provided by the institution/system using the peer-based anomalous rights detection system 102 (e.g., over network 104).

In addition to the rights vector 116a, 116b, each individual 101a, 101b, etc., may be associated with one or more category labels 118a, 118b, etc. The category labels 118a, 118b may describe various categories associated with the individuals 101a, 101b. For example, category labels 118a, 118b may include job titles, job categories, job families, roles, responsibilities, etc. The specific category labels used may vary according to the desired implementation. Category labels 118a, 118b may be stored in provisioned rights database 114 and/or at some other location and may be accessible by peer-based anomalous rights detection system 102.

As depicted in FIG. 1, peer-based anomalous rights detection system 102 may execute an N nearest neighbors algorithm to determine N nearest neighbors 120a, 120b, etc. The N nearest neighbors 120a, 120b represent the N most similar rights vectors in the rights space. For example, N nearest neighbors 120a represent the N most similar rights vectors to rights vector 116a for individual 101a. Similarly, N nearest neighbors 120b represent the N most similar rights vectors to rights vector 116b for individual 101b. Each of the rights vectors of the N nearest neighbors 120a, 120b are associated with a particular individual. These individuals are, in turn, associated with category labels (e.g., job titles, job categories, etc.).

A P100 score may be determined for individual 101a by determining the number of individuals of the N nearest neighbors 120a that have the same category label as category label 118a. Similarly, a P100 score may be determined for individual 101b by determining the number of individuals of the N nearest neighbors 120b that have the same category label as category label 118b.

P100 scores (or, more generally, P scores) may be determined for each individual of interest (e.g., for each employee of an institution). The peer-based anomalous rights detection system 102 may determine a distribution of P100 scores for each individual having the same category label as the subject individual. Note that this may be performed for multiple different category labels. For example, P100 distribution 122a may be a distribution of P100 scores for individuals having the same category label as individual 101a (e.g., having a category label identical to category label 118a). Similarly, P100 distribution 122b may be a distribution of P100 scores for individuals having the same category label as individual 101b (e.g., having a category label identical to category label 118b). The distributions may be used to determine how statistically anomalous the individual's rights are. For example, Z-score may be determined for each distribution. Individuals with large Z-scores may be anomalous with respect to other individuals having the same category label.

Figure 2:
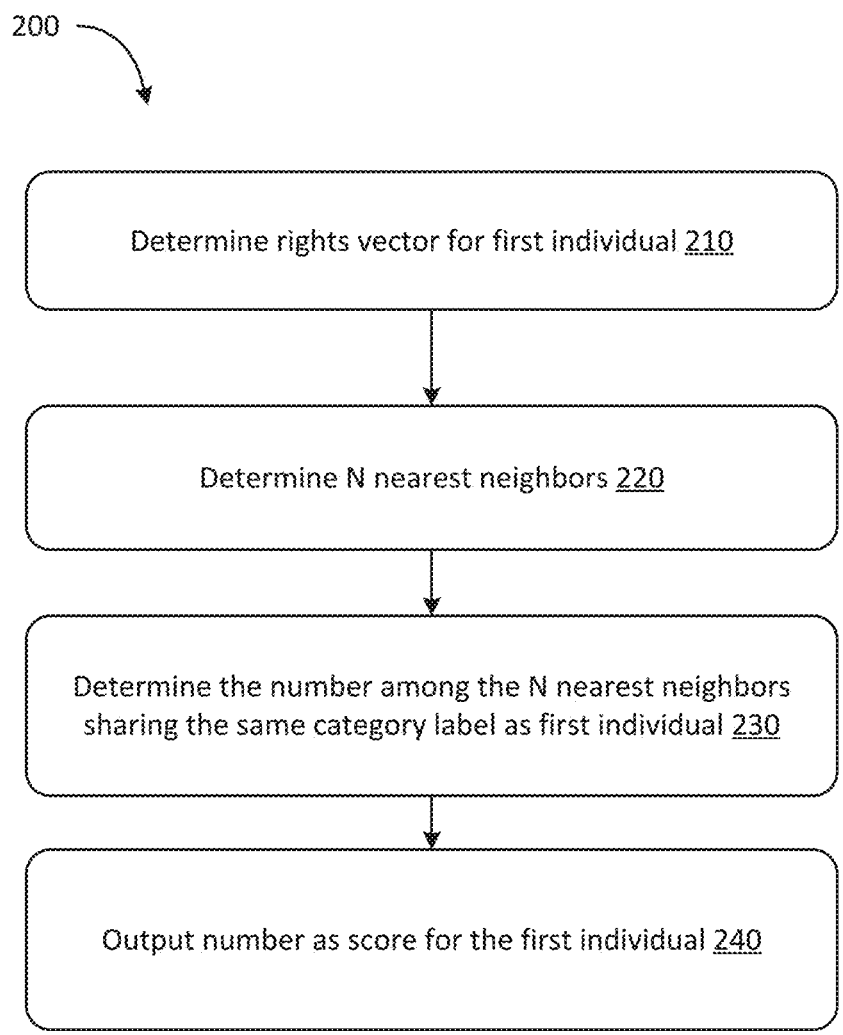
FIG. 2 is a flow diagram illustrating an example process for determining a score that may be used to determine anomalous rights provisioning, in accordance with various embodiments of the present disclosure.

FIG. 2 is a flow diagram illustrating an example process 200 for determining a score that may be used to determine anomalous rights provisioning, in accordance with various embodiments of the present disclosure. The process 200 of FIG. 2 may be executed by one or more computing devices. The actions of process 200 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 200 may be described above with reference to elements of FIG. 1. Although shown in a particular order, the steps of process 200 may instead be performed in a different order. Additionally, various steps may be performed in parallel in various implementations. Further, some steps may be omitted and/or other steps may be added in accordance with the peer-based anomalous rights detection techniques described herein.

Process 200 may begin at action 210, at which a rights vector for a first individual may be determined. The rights vector may represent rights held by the particular individual. As described above, each element of the rights vector may correspond to a particular right. The value of each element may indicate whether the individual has, or does not have, the right. For example, a value of 0 at a first element may indicate that the individual does not have the first right (corresponding to the first element), while a value of 1 at the first element may indicate that the individual does have the first right. In other examples, a value of 0 may indicate that the individual does have the right, while a value of 1 may indicate that the individual does not have the right. In addition, non-binary examples are also possible. For example, a particular right may be an access profile with a low-tier, mid-tier, and high-tier value. In the example, different numerical values may be used to encode each rights tier.

Process 200 may continue at action 220, at which the N nearest neighbors may be determined for the rights vector determined at action 210. For example, the ANNOY approximate nearest neighbor algorithm (or some other nearest neighbor algorithm) may be used to determine the N nearest neighbors in the rights space that have the most similar rights to the individual. N may take any desired value.

Process 200 may continue at action 230, at which the number among the N nearest neighbors sharing the same category as the first individual may be determined. For example, the first individual may have a category label "Data analyst 3." The N nearest neighbor algorithm may output 100 nearest neighbors (e.g., for N=100). At action 230, the number of the 100 nearest neighbors that also have the category label "Data analyst 3" may be determined.

Process 200 may continue at action 240, at which the number determined at action 230 may be output as a score for the first individual. As described above, the number may be referred to as a P score or, in the case where N=100, a P100 score. In general, the score may represent whether the individuals with the most similar provisioned rights to the first individual are of the same category as the first individual.

Figure 3:
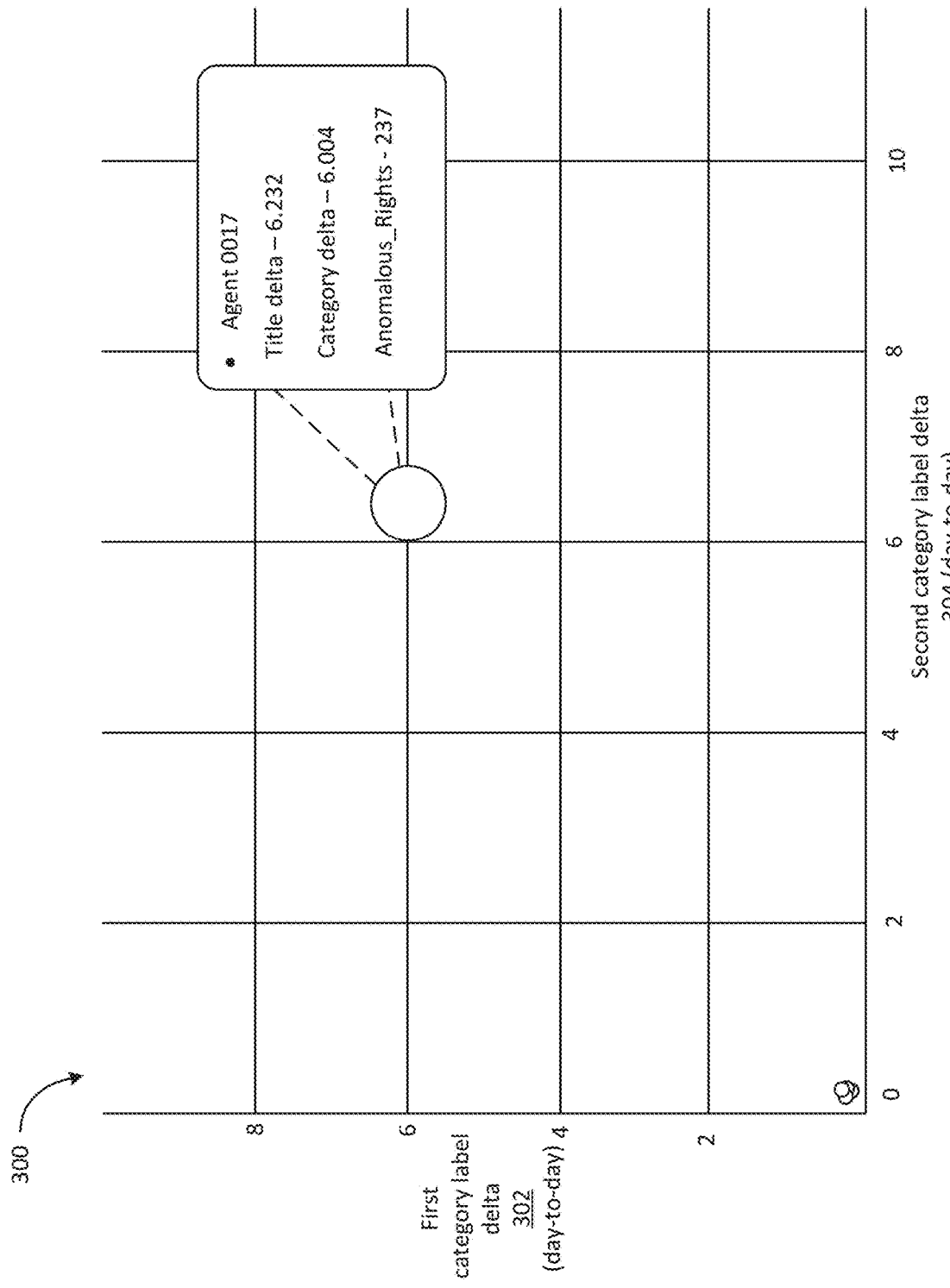
FIG. 3 is an interface depicting an example data visualization of a peer-based anomalous rights detection system, in accordance with various aspects of the present disclosure.

FIG. 3 is an interface depicting an example data visualization 300 of a peer-based anomalous rights detection system, in accordance with various aspects of the present disclosure. In examples where the peer-based anomalous rights detection system 102 is implemented as a service, data visualization 300 may be provided via a graphical user interface. In the example data visualization 300, the two axes represent the day-to-day change of P100 Z-scores for a first category label delta 302 (Y axis) and a second category label delta 304 (X axis). Each dot may represent an individual and the size of the dot indicates the number of anomalous rights granted during this period. The first category label and second category label being referred to in reference to FIG. 3 may be related to any category (e.g., job title, job family, job category, role, etc.). It should be appreciated that the particular data visualization of FIG. 3 is but one possible data visualization that may be used in accordance with the various techniques described herein. However, any suitable data visualization may be used to show anomalous rights and/or provisioning of anomalous rights, according to the desired implementation.

As seen in FIG. 3, the majority of individuals have day-to-day Z-scores clustered near the origin and thus have not seen statistically anomalous right grants over the past 24 hour period. However, Agent 0017 has seen a day-over-day delta of P100 Z scores of 6.232 for the title category (e.g., title delta 304) and 6.004 for the category label (e.g., category delta 302), with 237 anomalous rights being granted. In various examples, the representative "segment vector" may be calculated for Agent 0017 to determine the anomalous rights. For example, for each category label (e.g., job family, job title, department, and/or any other desired category descriptor) a representative segment vector of rights may be determined. The segment vector may be a rights vector that takes the average of all values of all individuals having the relevant category label (e.g., an average vector for all rights values for the category label). In the case where the rights vectors are binary, the segment vector will have values between 0-1. Accordingly, the segment vector measures the relative propensity of each category to have or not have each right. Agent 0017's right vector may be subtracted from the segment vector and rights with less than a 1/10 chance of appearing given the employee category may be flagged for potential investigation. Accordingly, the segment vector may be used to determine that 237 anomalous rights are associated with Agent 0017.

In various examples, Agent 0017 may be flagged for investigation and/or an alert (e.g., alert data) may be generated indicating that Agent 0017 has been provisioned with anomalous rights within the last relevant time period (24 hours in the example of FIG. 3). For example, the alert data may indicate a number of anomalous rights granted to a particular individual. In some other examples, the alert data may indicate the segment vector for individuals having the same category label as the individual (e.g., to show what a typical individual's rights profile from the same category looks like). In some further examples, the alert data may show the top N most similar individuals (and/or their category labels) to the individual in terms of those individuals with the most similar rights profiles/vectors. The alert data may be generated based on an anomalous Z score (e.g., greater than 20 or any other desired value), based on the number of anomalous rights granted being above a given threshold, etc. The particular metric used to determine whether an alert should be generated may be varied according to the desired implementation.

Figure 4:
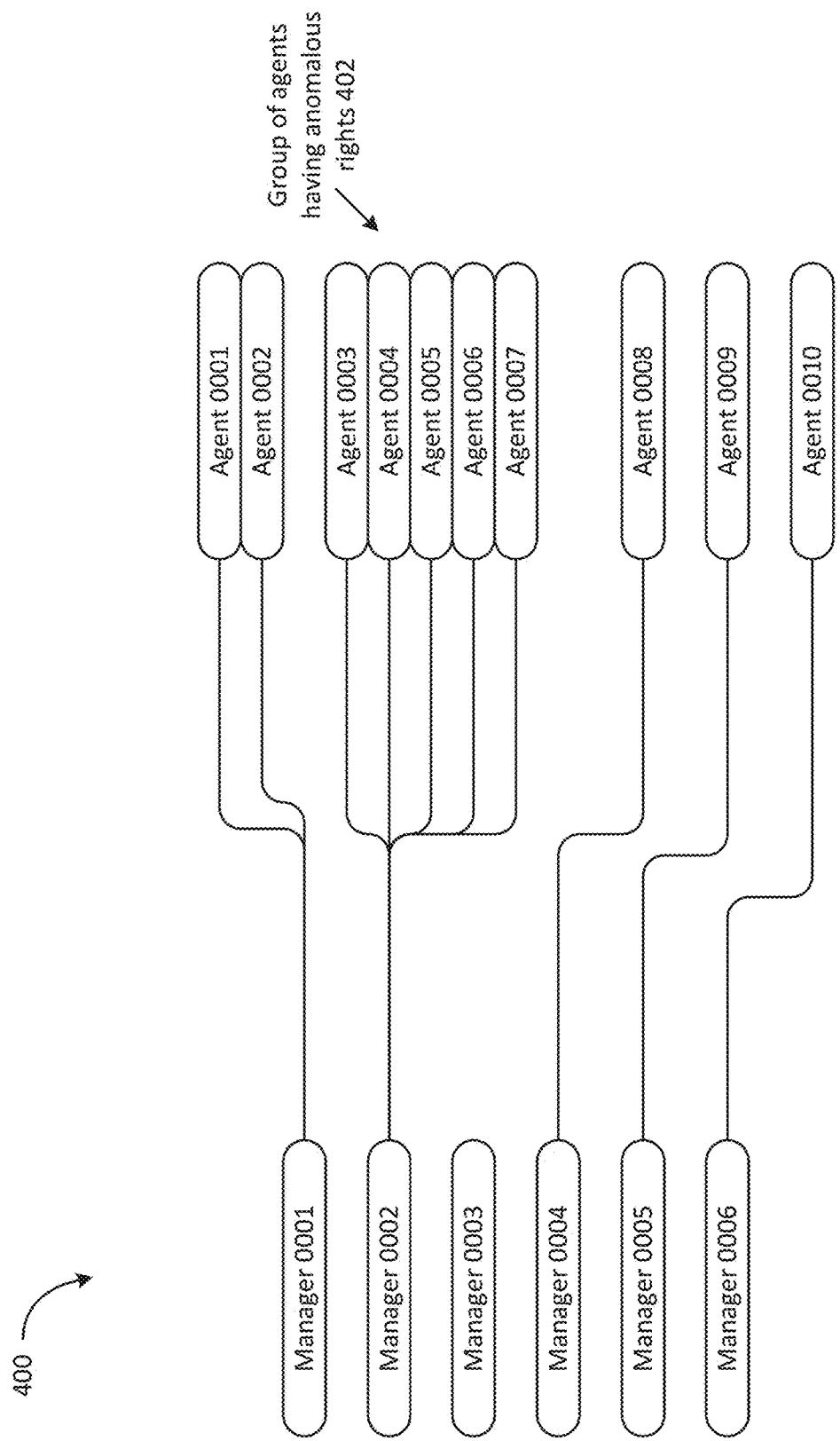
FIG. 4 is another interface depicting another example data visualization of a peer-based anomalous rights detection system, in accordance with various aspects of the present disclosure.

FIG. 4 is another interface depicting another example data visualization 400 of a peer-based anomalous rights detection system, in accordance with various aspects of the present disclosure. In examples where the peer-based anomalous rights detection system 102 is implemented as a service, data visualization 400 may be provided via a graphical user interface. In various examples, after determining that one or more individuals have anomalous rights (e.g., based on Z-scores and/or changes in Z-scores exceeding a desired threshold), data visualizations may be provided to show hierarchical report chains. Such hierarchical visualizations may show that many individuals with anomalous rights report directly to the same individual. For example, in FIG. 4, the Agents 0001-0010 may have been determined to have anomalous rights. As can be seen, Agents 0003-0007 (e.g., group of agents having anomalous rights 402) all report to the same Manager 0002. Accordingly, while Manager 0002 may not themselves have anomalous rights, Manager 0002 may be flagged for investigation based on possible provisioning of anomalous rights to their direct reports.

Figure 5:
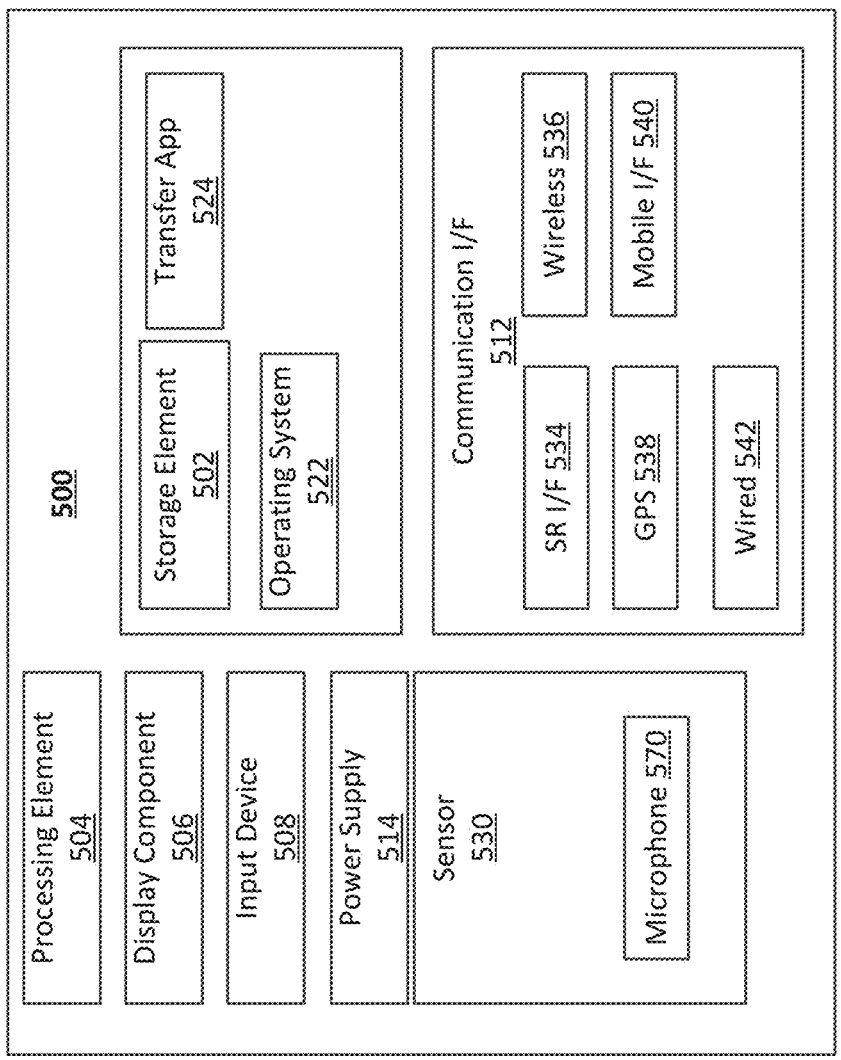
FIG. 5 is a block diagram showing an example architecture of a computing device that may be used in accordance with various embodiments described herein.

FIG. 5 is a block diagram showing an example architecture 500 of a computing device that may be used to implement, at least in part, a peer-based anomalous rights detection system, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
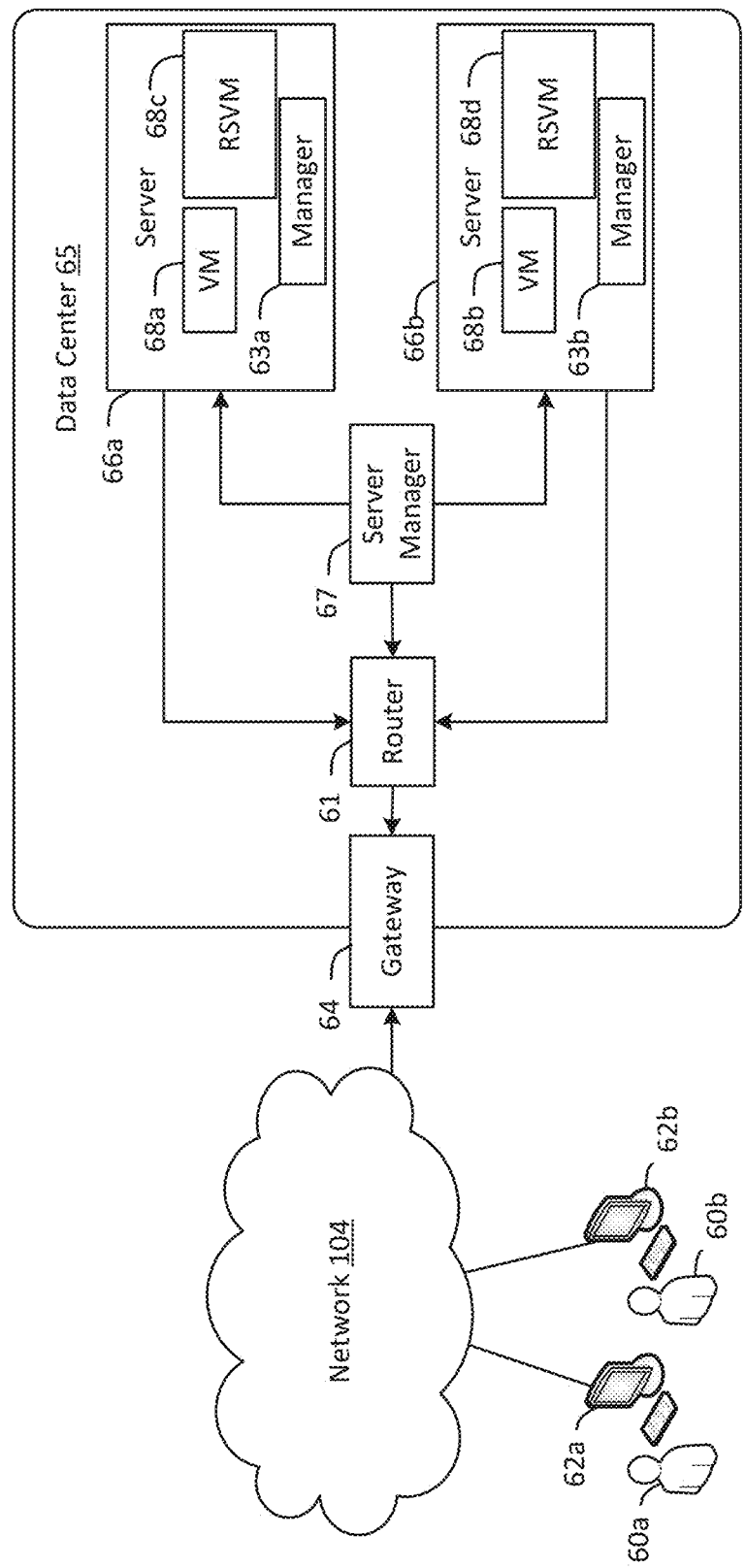
FIG. 6 is a diagram illustrating an example system for sending and providing data that may be used in accordance with the present disclosure.

An example system for implementing a peer-based anomalous rights detection system will now be described in detail. In particular, FIG. 6 illustrates an example computing environment in which the embodiments described herein may be implemented. For example, the computing environment of FIG. 6 may be configured to provide peer-based anomalous rights detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
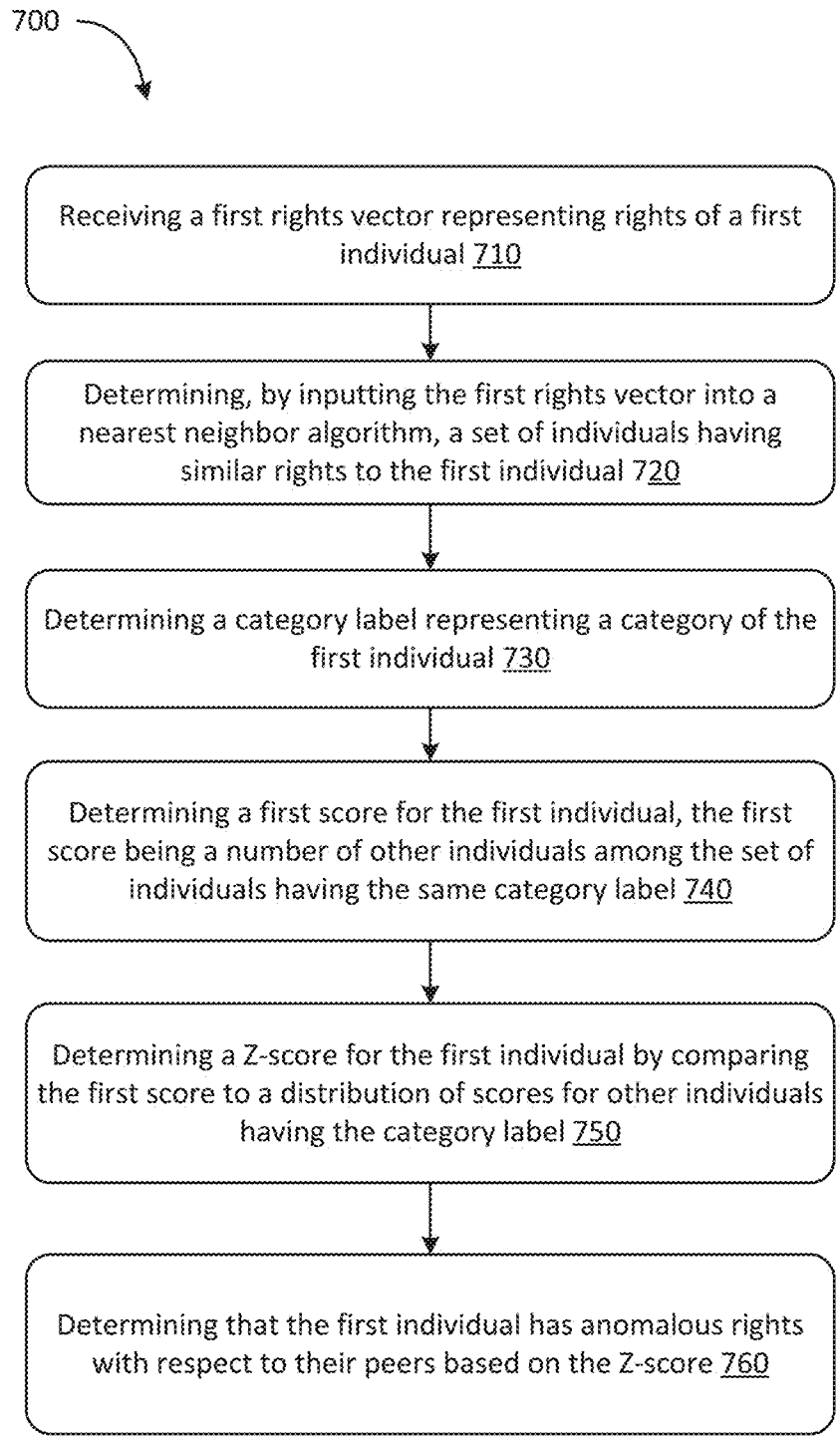
FIG. 7 is a flow diagram illustrating an example process for determining that an individual has anomalous rights, according to various techniques described herein.

FIG. 7 is a flow diagram illustrating an example process 700 for determining that an individual has anomalous rights, according to various techniques described herein. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the peer-based anomalous rights detection techniques described herein.

Process 700 may begin at action 710, at which a first rights vector representing rights of a first individual may be determined. The rights vector may represent rights held by the particular individual. As described above, each element of the rights vector may correspond to a particular right. The value of each element may indicate whether the individual has, or does not have, the right. For example, a value of 0 at a first element may indicate that the individual does not have the first right (corresponding to the first element), while a value of 1 at the first element may indicate that the individual does have the first right. In other examples, a value of 0 may indicate that the individual does have the right, while a value of 1 may indicate that the individual does not have the right. In addition, non-binary examples are also possible. For example, a particular right may be an access profile with a low-tier, mid-tier, and high-tier value. In the example, different numerical values may be used to encode each rights tier.

Processing may continue at action 720, at which, a set of individuals having similar rights to the first individual may be determined by inputting the first rights vector into a nearest neighbor algorithm. For example, the 100 most similar rights vectors may be determined for the input rights vector for the first individual. Each of the 100 most similar rights vectors may be associated with another individual. As previously described, in some cases, using an approximate nearest neighbor algorithm may greatly reduce the computational load and/or complexity.

Processing may continue at action 730, at which a category label representing a category associated with the first individual may be determined. In various examples, a category label that is associated with the first individual may be determined for comparing with category labels of the individuals determined at action 720. Any category label may be used, but some common examples may include job title, job code, job category, job family, etc.

Processing may continue to action 740, at which a first score may be determined for the first individual. The first score may be a number of other individuals among the set of individuals having the same category label. The score represents those individuals who have similar rights to the first individual and who share the same category label as the first individual. Accordingly, if the score is relatively low it may indicate that few individuals with similar rights are of the same category as the first individual.

Processing may continue to action 750, at which a Z-score may be determined for the first individual by comparing the first score to a distribution of scores for other individuals having the category label. For example, the distribution of the scores (e.g., P scores) for all individuals having the same category label as the first individual may be determined. The Z-scores may be calculated to determine a distance from the mean value P score for the first individual.

Processing may continue to action 760, at which a determination may be made that the first individual has anomalous rights with respect to their peers based on the Z-score. For example, if the Z-score indicates that the first individual is greater than 3 standard deviations (or some other suitable threshold) above the mean P score for individuals having the same descriptor label it may be determined that the first individual has anomalous rights. An alert may be generated and/or the first individual may be flagged for investigation by human investigators. As previously described, in some examples, a segment vector may be used to determine which rights are particularly anomalous for the first individual.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of peer-based anomalous rights detection, the method comprising:
   receiving first vector data representing rights associated with a first individual, wherein each element of the first vector data represents a respective right, and wherein a value of each respective element represents whether the first individual has the respective right corresponding to that element;
   determining, by inputting the first vector data into an approximate nearest neighbor algorithm, a set of individuals having similar rights to the first individual based on similarity between the first vector data and respective second vector data representing rights of individuals of the set of individuals;
   determining a category label representing a category of the first individual;
   determining a first score for the first individual, the first score being a number of other individuals among the set of individuals having the category label;
   determining a mean score for other individuals having the category label;
   determining a residual value for the first individual, the residual value being a difference between the mean score and the first score;
   determining that the first individual has anomalous rights with respect to their peers based on the residual value; and
   modifying at least one value of the first vector data, wherein modifying the at least one value removes a first right that permits a computing device associated with the first individual to access controlled information.

2. The method of claim 1, further comprising:
    determining a representative segment vector representing an average vector for individuals having the category label;
    comparing each element of the first vector data to each corresponding element of the representative segment vector;
    determining a value of a first element of the first vector data indicates that the first individual has the first right corresponding to the first element;
    determining, using the representative segment vector, that less than a threshold percentage of individuals have the first right; and
    generating output data comprising instructions to investigate the first individual having the first right.

3. The method of claim 1, further comprising:
    determining a group of individuals having anomalous rights with respect to other individuals having the same category label as the group;
    determining that each individual of the group reports to a second individual; and
    generating output data comprising instructions to investigate provisioning of the anomalous rights to the group by the second individual.

4. A method of anomaly detection comprising:
    determining, for a first individual, first vector data representing rights held by the first individual;
    determining, by inputting the first vector data into a nearest neighbor algorithm, a set of individuals having one or more rights common to the first individual based on similarity between the first vector data and respective second vector data representing rights of individuals of the set of individuals;
    determining a category label associated with the first individual;
    determining a number of individuals of the set of individuals having the category label;
    determining a first score for the first individual, the first score being a number of other individuals among the set of individuals having the category label;
    determining a mean score for other individuals having the category label;
    determining that the rights held by the first individual are anomalous based at least in part on the first score and the mean score; and
    modifying at least one value of the first vector data, wherein modifying the at least one value removes a first access right that permits a computing device associated with the first individual to access controlled information.

5. The method of claim 4, wherein the nearest neighbor algorithm is an approximate nearest neighbor algorithm, the method further comprising determining the set of individuals by comparing data representing rights of the individuals of the set of individuals to the first vector data of the first individual.

6. The method of claim 4, further comprising determining a standard deviation of the number with respect to a mean value of the number for other individuals having the category label.

7. The method of claim 6, further comprising determining that the rights held by the first individual are anomalous with respect to other individuals having the category label based at least in part on the standard deviation.

8. The method of claim 4, further comprising:
    determining a predominant category label among the set of individuals having one or more rights common to the first individual; and
    generating output data that indicates that similar rights holders to the first individual are associated with the predominant category label.

9. The method of claim 4, further comprising:
    determining a representative segment vector representing an average vector for individuals having the category label;
    comparing each element of the first vector data to each corresponding element of the representative segment vector;
    determining a value of a first element of the first vector data indicates that the first individual has the first right corresponding to the first element;
    determining, using the representative segment vector, that less than a threshold percentage of individuals have the first right; and
    generating output data comprising instructions to investigate the first individual having the first right.

10. The method of claim 4, further comprising causing to display a first data visualization depicting a representation of a day-to-day change in Z-score for the number with respect to other individuals having the category label.

11. The method of claim 4, further comprising:
    determining a group of individuals having anomalous rights with respect to other individuals having the same category label as the group;
    determining that each individual of the group reports to a second individual; and
    generating output data comprising instructions to investigate provisioning of the anomalous rights to the group by the second individual.

12. The method of claim 4, further comprising modifying, based at least in part on the determining that the rights held by the first individual are anomalous, a rights profile of the first individual, wherein modifying the rights profile of the first individual comprises modifying the at least one value to remove permission for the first a first compute action.

13. A system comprising:
    at least one processor; and
    non-transitory computer-readable memory storing instructions that, when executed by the at least one processor, are effective to:
        determine, for a first individual, first vector data representing rights held by the first individual;
        determine, by inputting the first vector data into a nearest neighbor algorithm, a set of individuals having one or more rights common to the first individual based on similarity between the first vector data and respective second vector data representing rights of individuals of the set of individuals;
        determine a category label associated with the first individual;
        determine a number of individuals of the set of individuals having the category label;
        determine a first score for the first individual, the first score being a number of other individuals among the set of individuals having the category label;
        determine a mean score for other individuals having the category label;
        determine that the rights held by the first individual are anomalous based at least in part the first score and the mean score; and modify at least one value of the first vector data, wherein modifying the at least one value removes a first access right that permits a computing device associated with the first individual to access controlled information.

14. The system of claim 13, wherein the nearest neighbor algorithm is an approximate nearest neighbor algorithm, the non-transitory computer-readable memory storing further instructions that, when executed by the at least one processor, are further effective to determine the set of individuals by comparing data representing rights of the individuals of the set of individuals to the first vector data of the first individual.

15. The system of claim 13, the non-transitory computer-readable memory storing further instructions that, when executed by the at least one processor, are further effective to determine a standard deviation of the number with respect to a mean value of the number for other individuals having the category label.

16. The system of claim 15, the non-transitory computer-readable memory storing further instructions that, when executed by the at least one processor, are further effective to:
   determine that the rights held by the first individual are anomalous with respect to other individuals having the category label based at least in part on the standard deviation.

17. The system of claim 13, the non-transitory computer-readable memory storing further instructions that, when executed by the at least one processor, are further effective to:
   determine a predominant category label among the set of individuals having one or more rights common to the first individual; and
   generate output data that indicates that similar rights holders to the first individual are associated with the predominant category label.

18. The system of claim 13, the non-transitory computer-readable memory storing further instructions that, when executed by the at least one processor, are further effective to:
   determine a representative segment vector representing an average vector for individuals having the category label;
   compare each element of the first vector data to each corresponding element of the representative segment vector;
   determine a value of a first element of the first vector data indicates that the first individual has the first right corresponding to the first element;
   determine, using the representative segment vector, that less than a threshold percentage of individuals have the first right; and
   generate output data comprising instructions to investigate the first individual having the first right.

19. The system of claim 13, the non-transitory computer-readable memory storing further instructions that, when executed by the at least one processor, are further effective to:
   cause to display a first data visualization depicting a representation of a day-to-day change in Z-score for the number with respect to other individuals having the category label.

20. The system of claim 13, the non-transitory computer-readable memory storing further instructions that, when executed by the at least one processor, are further effective to:
   determine a group of individuals having anomalous rights with respect to other individuals having the same category label as the group;
   determine that each individual of the group reports to a second individual; and
   generate output data comprising instructions to investigate provisioning of the anomalous rights to the group by the second individual.

* * * * *